United States Patent [19]
York

[11] 3,907,483
[45] Sept. 23, 1975

[54] APPARATUS FOR AUTOMATICALLY REMOVING FINISHED ARTICLE FROM INJECTION MOLD

[75] Inventor: Raymond A. York, Rockford, Ill.

[73] Assignee: Beloit Corporation, Beloit, Wis.

[22] Filed: Mar. 29, 1974

[21] Appl. No.: 456,297

[52] U.S. Cl............... 425/436 R; 425/444; 425/455
[51] Int. Cl.² ........................................... B29F 1/14
[58] Field of Search .......... 425/436, 139, 165, 455, 425/246, 444, 436 R

[56] References Cited
UNITED STATES PATENTS

| | | | |
|---|---|---|---|
| 2,375,955 | 5/1945 | Smith | 425/246 |
| 2,759,221 | 8/1956 | Edwards | 425/140 |
| 2,809,394 | 10/1957 | Harvey | 425/165 X |
| 2,839,786 | 6/1958 | Alesi | 425/455 X |
| 2,954,584 | 10/1960 | Groves | 425/455 X |
| 3,407,444 | 10/1968 | Rees | 425/165 X |
| 3,454,991 | 7/1969 | Rees | 425/169 |
| 3,833,329 | 9/1974 | Ulmachneider et al. | 425/246 |

*Primary Examiner*—Francis S. Husar
*Assistant Examiner*—David S. Safran
*Attorney, Agent, or Firm*—Dirk J. Veneman; Bruce L. Samlan; Gerald A. Mathews

[57] ABSTRACT

To remove a finished article from an injection molding apparatus, a conveyor is moved into the space between the separated mold platens. Removing devices such as ejector rods and a deflector member, the latter on the outer side of the article, then cooperate with the conveyor to remove the article from a mold part on which it has remained upon separation of the platens, preferably properly oriented, onto the conveyor which is then moved out from between the platens, leaving the latter free to close for a new molding cycle. Using strategically placed limit switches, the operation can be made automatic.

14 Claims, 5 Drawing Figures

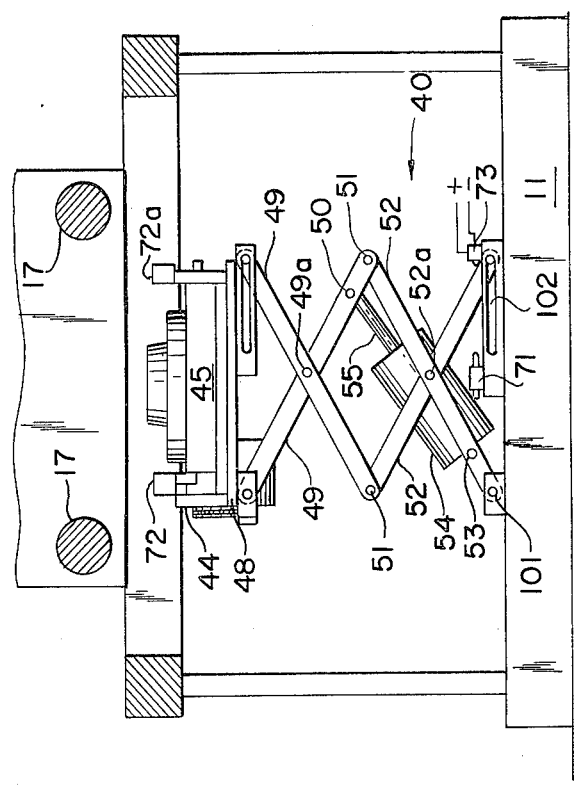
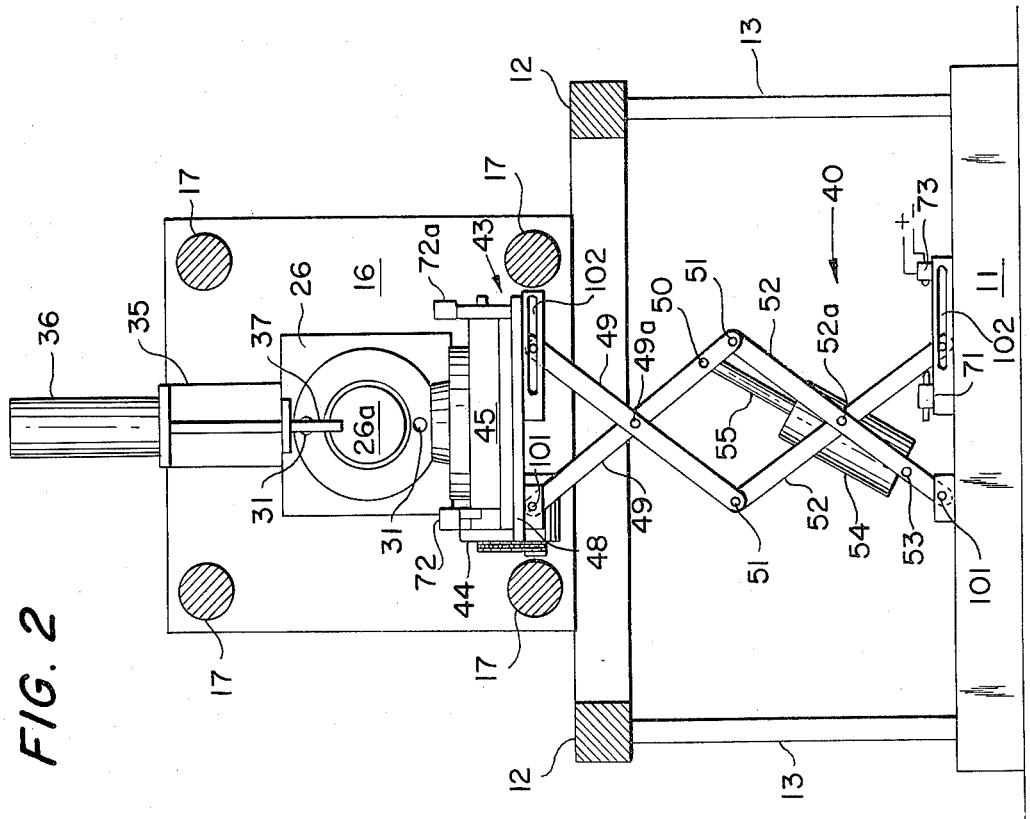

APPARATUS FOR AUTOMATICALLY REMOVING FINISHED ARTICLE FROM INJECTION MOLD

BACKGROUND OF THE INVENTION

This invention relates to injection molding, and in particular it relates to removing a finished article from the mold.

Owing to the need to develop very high pressures, injection molding machines tend to be rather large, in fact they are often massive when considered in relation to the size of the finished article produced thereby. Consequently, conveyors or the like used to carry away the finished articles are normally located adjacent to the machine but spaced somewhat from the actual mold parts. Consequently, according to the present state of the art, a finished article, after being removed from the mold part to which it would normally adhere when opening the mold, usually with the aid of ejector rods, must be conveyed to the adjacent awaiting conveyor either manually or by means of an industrial robot machine. Manual operation will naturally tend to increase the cost and reduce the overall operating efficiency of the injection molding apparatus, while industrial robot machines tend to be very expensive and occupy considerable floor space. Hence, there exists a need for improvements to overcome these disadvantages of the prior art.

SUMMARY OF THE INVENTION

Thus, it is a purpose of this invention to provide, in an injection molding machine, a new improvement which will overcome these disadvantages of the prior art.

This purpose of the present invention is achieved by providing an arrangement wherein a conveyor means is movable into the space between the separated mold platens for directly receiving the finished article as it is removed from its respective mold part. The conveyor means is then operable to convey the finished article out from between the mold platens, preferably onto a further receiving means and also to be withdrawn from the space between the mold platens, thereby permitting the latter to commence a new molding cycle.

In accordance with a preferred embodiment, the conveyor means may be movable between a withdrawn position beneath the mold platens and a raised position between the mold platens but beneath the level of the finished article. The mold parts of an injection mold which are mounted on the mold platens will normally comprise a male part and a female part, in which case the finished article would normally adhere to the male part as the two mold parts separated from each other. In some molding operations, both mold parts are recessed, female parts, but in these cases it is still possible to select the mold part to which the finished article will adhere. The conveyor means would then be located just beneath the level of the article and means would be provided for removing the article from its respective mold part directly onto the conveyor means.

The means for actually effecting movement of the finished article may comprise the ejector rods which are of course known per se, these rods passing through the mold part, a deflector member adapted to be moved down into the space between the separated mold parts adjacent the outer side of the article and also a feature of the conveyor means itself whereby the surface thereof is made to move in a direction away from the mold part containing the finished article. In operation, the conveyor surface would be operated as the ejector rods physically ejected the finished article off of the mold part in such a manner that the upper portion of the finished article engages the deflector member, thereby tilting the finished article to properly orient the same onto the moving conveyor means.

It is a further feature of the present invention that the entire operation can be rendered essentially automatic. This would be accomplished in the following manner. As the mold platens separate, they operate a limit switch which in turn lowers the deflector member and causes the conveyor means to move into its position between the mold platens. As the conveyor means reaches this position, it operates another limit switch which commences movement of the conveyor means surface, preferably an endless belt, and also operates the ejector rods which eject and immediately return to their withdrawn position. The belt moves only the distance necessary to complete transfer of the article from the mold to the conveyor means whereupon a suitable means such as a limit switch, a photoelectric device or the like operates to terminate movement of the belt, to move the conveyor means to its withdrawn position and to move the deflector member upwardly out from between the mold parts. As the conveyor means reaches this withdrawn position, it then operates a limit switch to again commence movement of the conveyor means surface so as to transfer the finished article onto a further receiving means located adjacent the withdrawn position of the conveyor means and also commence operation of the injection molding machine for a further cycle.

Thus, it is an object of this invention to provide a new and improved means for removing a finished article from an injection molding machine.

It is another object of this invention to provide a new and improved method and apparatus for removing finished articles from an inejetion molding machine wherein a conveyor means is moved into a position between the mold platens to receive the finished article after which both the article and the conveyor means are withdrawn from this area, the article being transferred to a further receiving means.

It is still another object to this invention to provide, for an injection molding machine, a new and improved means for removing finished articles whereby a conveyor means positioned between the mold platens beneath the level of the article (while the latter is still on a mold part) cooperates with removing devices such as ejector rods and a deflector member or the like for physically removing the finished article from its respective mold part directly onto the conveyor means, and preferably properly oriented thereon.

It is still another object of this invention to provide a means for removing a finished article from an injection molding apparatus comprising a conveyor means movable from a withdrawn position beneath the platens to a raised position between the separated platens.

It is still another object of this invention to provide an injection molding machine having a conveyor means movable between the apparatus mold platens for receiving a finished article, wherein the entire operation can be carried out automatically.

These and other object of the present invention will become more apparent from the detailed description of

BRIEF DESCRIPTION OF THE DRAWINGS

There follows a detailed description of preferred embodiments of the invention to be read together with the accompanying drawings in which.

Figure 4:
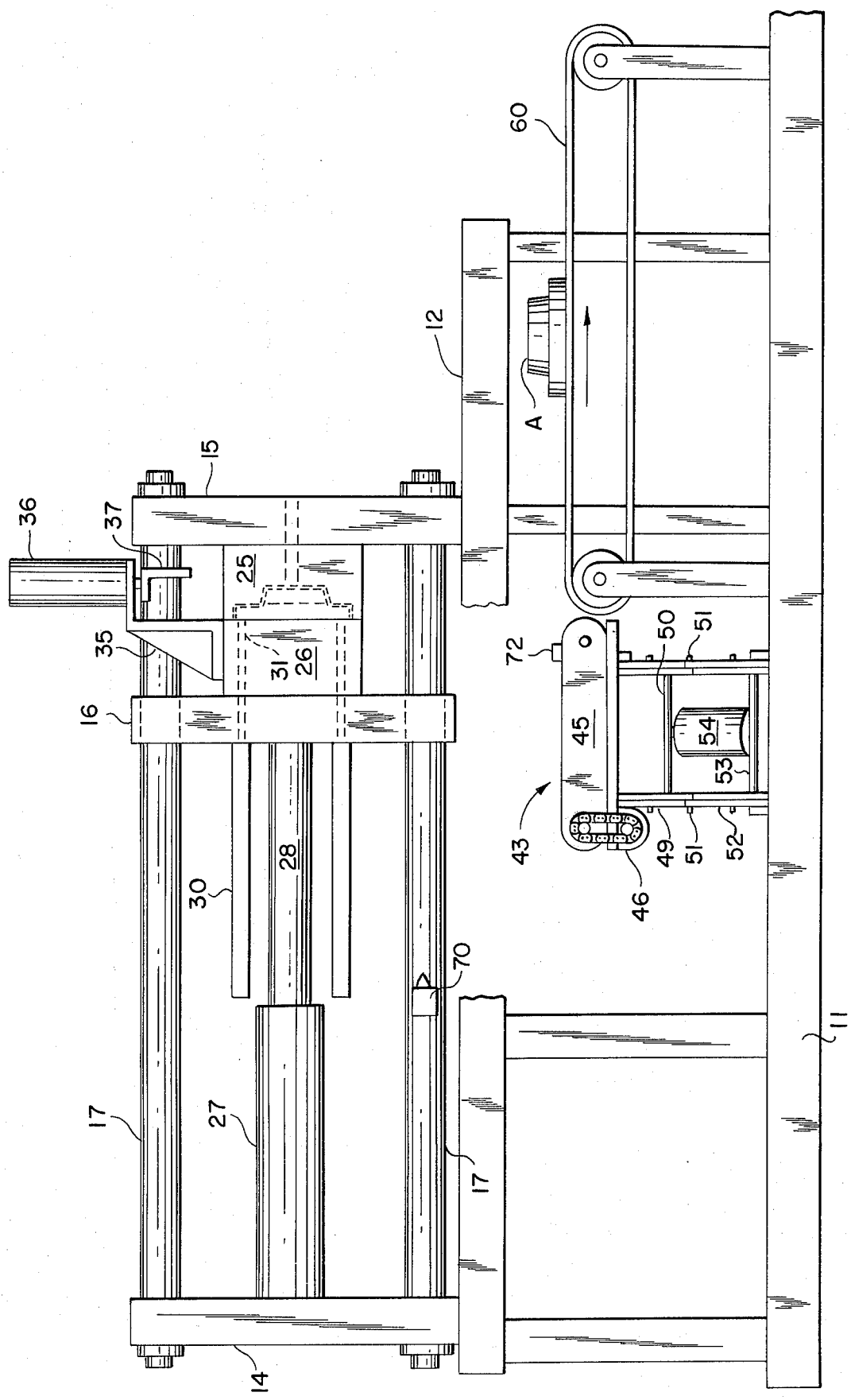

In each of FIGS. 2 through 4 the schematic representations of the valves and the electrical lines to the switches have been deleted for purposes of clarity.

Figure 1:
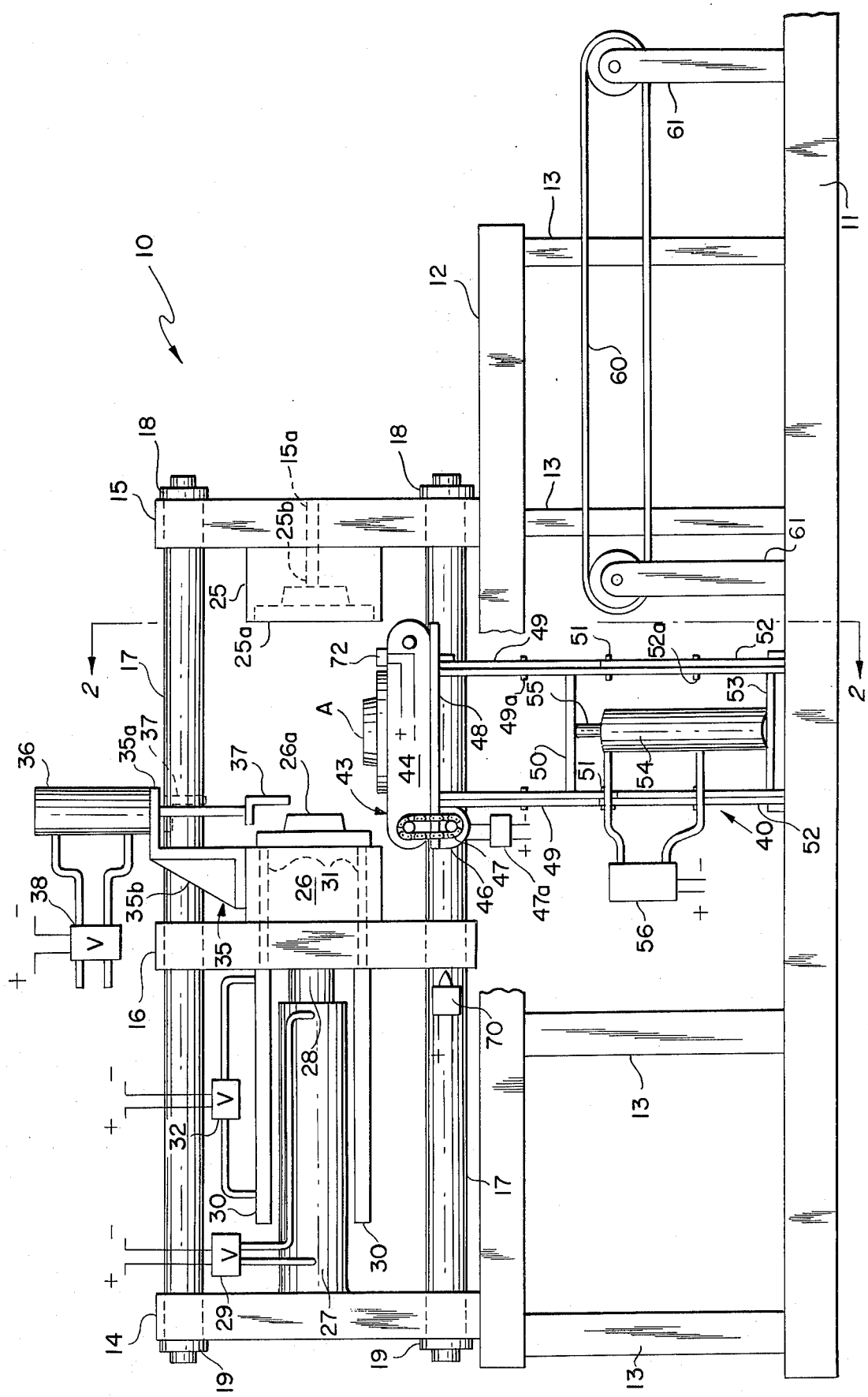
FIG. 1 is a side elevational view of an injection molding machine including the features of the present invention wherein the various valves and switches are shown schematically.

FIG. 2 is a cross-sectional view taken along line 2—2 of FIG. 1.

FIG. 3 is a partial cross-sectional view similar to FIG. 2 but showing the conveyor means in the withdrawn position.

FIG. 4 is a side elevational view similar to FIG. 1 but showing the parts in a different position.

Figure 5:
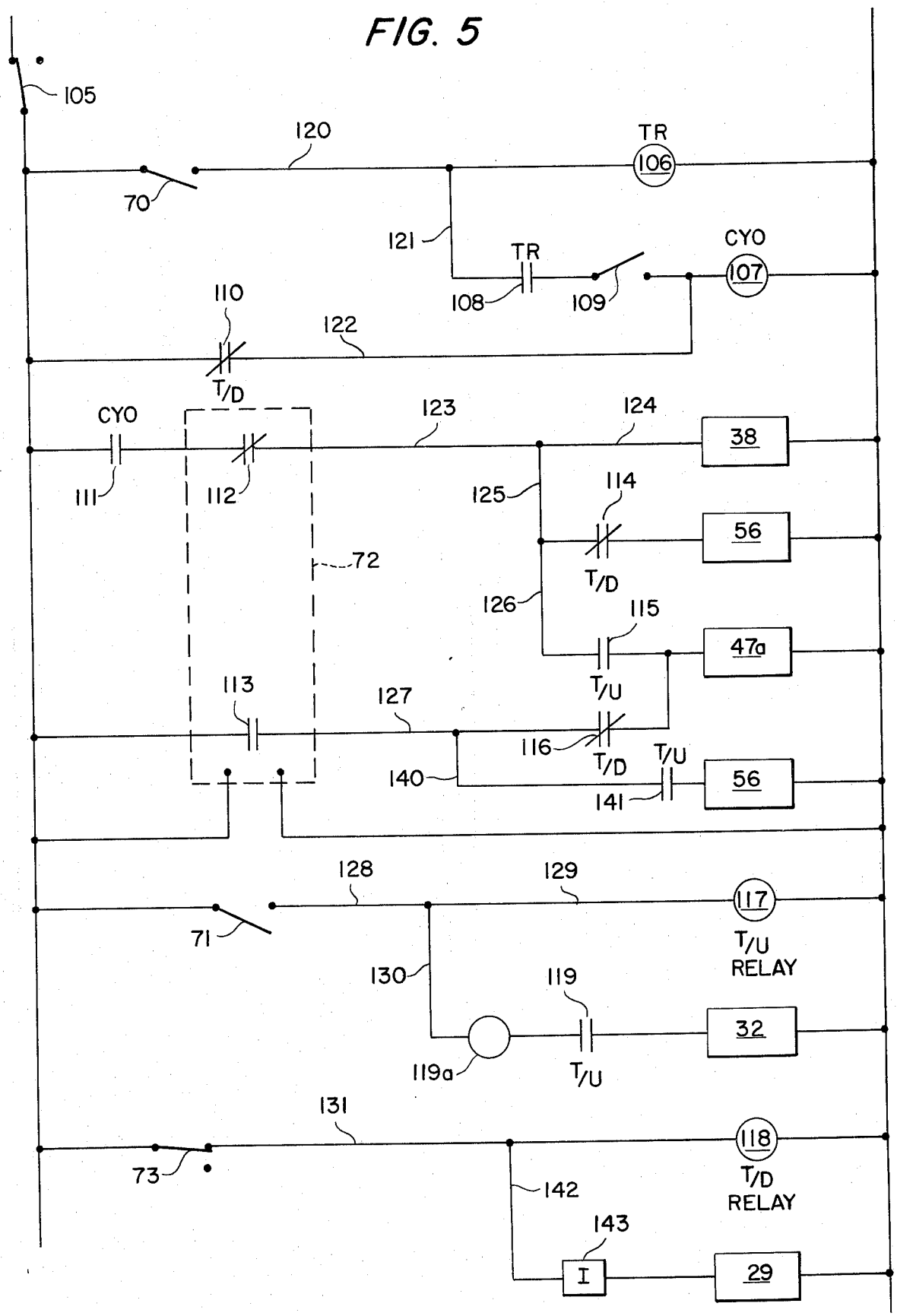

FIG. 5 is a schematic diagram illustrating an electrical circuit for automatic operation of the present invention.

DETAILED DESCRIPTION OF THE PREFERRED EMBODIMENTS

Referring now to the drawings, like elements are represented by like numerals throughout the several views.

Referring now to FIG. 1, there is shown an injection molding apparatus 10 mounted on a base 11. Side frame members 12 are provided with transverse cross-beams (not shown) for supporting the major portions of the apparatus, these side frames being supported above the base 11 by leg supports 13. A cylinder base plate 14 and a stationary platen 15 are mounted on the frame and interconnected in a conventional manner by tie rods 17 which are connected to the stationary platen 15 and the cylinder base plate 14 by means of nuts 18 and 19, respectively. The side frames 12 are broken away in FIG. 1 to more clearly illustrate the central portion of the injection molding apparatus which includes a movable platen 16 slidably mounted on the tie rods 17. A hydraulic clamping cylinder 27 fixed to the cylinder base plate 14 has a piston rod 28 extending therefrom which is in turn fixedly connected to the movable platen 16 for reciprocating the latter along the tie rods relative to the stationary platen 15. A first mold part 25 having a recess 25a therein corresponding to the shape of the article currently being formed is mounted on the stationary platen 15. This recess 25a further includes a pasage 25b which communicates with the opening 15a in the stationary platen. As is known in the art, when the mold is closed, the material is injected through the openings 15a and 25b. The other mold part 26 is secured to the movable platen 16 and includes a raised part 26a which mates with the recess 25a to form the cavity of the article to be formed (see FIG. 4 which illustrates the mold parts in the closed position). The mold part 25 therefore constitutes the female mold part while the mold part 26, constitutes the male mold part. This is the conventional arrangement although is some cases both mold parts are recessed, female parts. Also mounted on the movable platen 16 are conventional hydraulic ejectors comprising cylinders 30 and ejector rods 31.

Piston and cylinder 27 and 28 would be double acting and there is illustrated schematically in FIG. 1 a valve 29, preferably an electrically operated solenoid valve as indicated in the figure, for controlling movement of the piston associated with rod 28 within the cylinder 27. Similarly, an electrically operated solenoid valve 32 would preferably be provided for controlling movement of the rods 31 in both directions within their respective cylinders 30. An electrical current causes 32 to deliver pressurized fluid to project the rods and upon the removal of such current the valve springs back to its other position for immediate removal of fluid from 30 so that the rods 31 immediately retract. For simplicity, the valve 32 is shown as being connected to only one of the plurality of cylinders 30.

Referring now to FIGS. 1 and 4, a support member 35 is fixedly secured to that mold part to which the finished article will adhere upon separation of the mold platens 16 and 15 from each other. In this case, the article would adhere to the male mold part 26. The support member 35 constitutes a reverse L shaped structure with an additional flange 35a extending outwardly therefrom. The member may be strengthened by a web 35b. Mounted on the flange 36a is a cylinder 36 having a rod extending therefrom through flange 35a with a deflector member 37 secured to the lower portion thereof. Cylinder 36 is preferably pneumatically operated and the flow of operating fluid thereto may be controlled by a valve 38 which is preferably electrically operated. Current delivered to the valve 38 causes it to lower the deflector 37 and the removal of current permits valve 38 to spring to an opposite position to release fluid so that 37 can spring up to its raised position. It will be understood that the male mold part to which the finished article adheres may be placed on the stationary platen 15 in which case the ejector rods would be mounted on platen 15 and the stop member would be mounted on that mold part. Also if both mold parts were recessed, female mold parts, either one could be designed and/or operated to have the finished article adhere thereto.

Referring now specifically to FIG. 1 and 2, an important feature of the invention constitutes a means for moving a conveyor into the area between the separated mold platens for receiving the finished article. In accordance with the preferred embodiment, this conveyor means comprises a belt conveyor 43 having a pair of side plates 44 for mounting the pulleys on which are mounted the endless belt 45. Referring to FIG. 1, a power means such a hydraulic motor 46 is operatively connected to one of the belt pulleys by means of belt 47, the flow of fluid to the motor being controlled by electrically controlled valve 47a. When current is fed to 47a it operates to deliver fluid to motor 46 to operate the belt and in the absence of such current it springs back to another position at which pressure fluid is not delivered to motor 46 and the belt stops.

In the present invention, the conveyor is moved vertically, i.e. lifted upwardly into the said space between the platens and then withdrawn downwardly. This lifting function is carried out by means of a folding lift 40 comprising on each side a pair of upper lift arms 49 crossing each other and pivotally connected together at 49a. Two of the arms 49 on opposite sides of the lift are interconnected by a rigid cross arm 50. The arms 49 on each side are in turn pivotally connected at 51 to a pair of lower lift arms 52 which are themselves pivotally connected together at 52a. Two of the arms 52 on opposite sides are interconnected by a rigid cross arm 53. It will be apparent by comparing FIG. 2 and 3 that this structure constitutes a folding linkage so arranged as to lift and lower the support plate 48 and the conveyor means located thereon. To accomplish this, on each side one lower lift arm 52 and that lift arm 49 to which it is connected at 51 are pivotally connected to the base 11 and the support plate 48, respectively, at fixed pivot points 101 while the upper end of the other arm 49 and the lower end of the arm 52 to which it is connected are slidable in slots 102 on the plate 48 and the base 11, respectively. Raising and lowering of the lift structure 40 is accomplished by means of a double acting hydraulic piston and cylinder unit 54 and 55, the cylinder 54 being fixedly secured on the cross arm 53 and the piston rod 55 being fixed secured at its upper end to the cross arm 50. A valve 56, preferable electrically operated, controls the flow of hydraulic fluid to and from the cylinder 54.

Also shown in FIGS. 1 and 4 is a continuously operable conveyor 60 adapted to carry away the finished articles. The manner of operation will be explained in greater detail below. However, at this time, referring to FIG. 4, it will be seen that when the conveyor 43 is in its lowered position, it is aligned with conveyor 60 onto which the removed article would be transferred for removal from the area of the injection molding apparatus. The conveyor 60 might constitute for example a conventional endless belt having pulleys at opposite ends and supported above the base 11 by means of legs 61.

Also illustrated in the figures are a number of limit switches (which will be described in greater detail below) 70, 71, 72 and 73.

The preferred embodiment of the invention as described above operates as follows. FIG. 4 illustrates the position of the apparatus during the molding stage. The movable platen 16 has been moved to the right so as to close against each other the mold parts 25 and 26 to thereby form a recess therein. At this time the deflector member 37 is of course raised while the conveyor means 43 is in its lowermost position. Article A formed by the previous molding cycle is currently being carried away by the conveyor 60. At this stage also the ejector rods 31 are withdrawn within the outer surface of raised mold part 26a. After the article has been formed, the movable platen 16 is moved to the left to the position shown in FIG. 1. It will be noted hereinafter that the operation of the invention will be described with reference to the various control means which are provided for rendering the operation automatic. However, it should also be evident that the invention still provides significant advantageous results if the features thereof are not operated automatically. Upon reaching the position of FIG. 1, the mold platen 16 will operate a limit switch 70 which operates valve 38 so as to lower the stop member 37 to the position as shown in FIG. 1. This will also operate valve 56 so as to extend the piston 55 out of cylinder 54 to unfold the folding lift 40 thereby raising the support plate 48 and the conveyor means 43 mounted thereon.

After the lift 40 has reached its upper position a limit switch 71 is actuated. As shown in FIGS. 2 and 3, this switch 71 may be mounted on the base 11 so as to be engaged by a lower arm 52 moving along its slot 102 to the position corresponding to the raised position of lift 40. This operates valve 47a to operate hydraulic motor 46 to move the endless belt 45 in a direction such that the upper portion thereof moves to the right. At this time also the ejector rods 31 are extended to push the finished article off of raised mold part 26a and then immediately retracted. The article on the raised part 26a will hence move outwardly off of this part 26a but the uppermost portion thereof will engage the deflector member 37 at the lowermost portion thereof continues moving outwardly where it engages the moving endless belt 45. Consequently, this lowermost part will be carried to the right by the belt while the uppermost part falls downwardly behind the lowermost part. The article will then be located completely on the conveyor as shown at A in FIG. 1. Hence, it will be appreciated that the present invention is capable not only of removing a finished article but of uniformly orientating these articles on the conveyor means 43.

After the belt has turned a sufficient amount to properly orient the article on the conveyor the belt is stopped. This may be accomplished in several ways. As one example, a beam of light may be directed from a source 72a across the downstream end of conveyor surface 45 to a photosensitive receiver 72a. When the light beam is broken by article A, valve 47a, 56 and 58 will be operated to stop motor 46 (and hence belt 45), lower the folding lift 40, and to raise the deflector member 37, respectively.

Finally, when the conveyor means 43 reaches its lowermost position, a limit switch 73 is operated. Switch 73 may be mounted on base 11 like switch 71 but mounted so as to be engaged by the sliding lower arm 52 at its position corresponding to the lowered position of the lift 40. This performs at least two functions. Firstly, it starts the belt 45 moving once again to transfer the article A onto conveyor 60. The belt may be stopped in response to the restoration of the light beam onto photocell 72 when article A passes thereby. The location of the light beam would therefore of course be chosen so that when belt 4 stopped, the article had moved far enough onto conveyor 60 to be carried away thereby. Secondly, switch 73 operates valve 29 causing platen 16 to once again move towards the platen 15 to thereby initiate a new molding cycle.

The conveyor 43 is shown as being rigidly secured to the support plate 48. However, in accordance with an important modification of the present invention, the conveyor 43 could be mounted to the plate 48 via a turntable permitting the conveyor to turn 90° on its support plate to permit discharging of the finished articles laterally out to the side, in either the raised or lowered position of the lift 40.

FIG. 5 illustrates an electrical circuit diagram which could be utilized in the automatic operation of the present invention. Using this circuit, the apparatus would operate as follows. Firstly, the main power switch 105 would be moved to the closed position as shown. As shown, the circuit illustrates the position of the various relays and switches at that point in time illustrated in FIG. 4 wherein the mold is closed and the conveyor is in its withdrawn position. When the mold opens, the platen 16 first engages and closes limit switch 70 permitting current to flow through line 120. This operates a one time non-repeat timer relay 106 which in turn closes relay 108 and switch 109 permitting current to flow to the one cycle relay 107. Before proceeding, it will be noted that many relays are designated "T/D"

with a line drawn therethrough. These represent relays which are closed when the down limit switch 73 is closed as shown to deliver current through line 131 to the table down relay 118. Similarly, other relay switches are designated "T/U". These are open in the present diagram and are closed when the up limit switch 71 is closed to deliver current through lines 128 and 129 to the table up relay 117.

Continuing now with the operation of the invention, closing of the one cycle relay 107 closes relay contacts 111 permitting current to flow through lines 123 and 124 to the valve 38 for lowering the deflector member and through line 125 and through relay 114 to valve 56 for raising the conveyor lift 40.

As the conveyor reaches its uppermost position, the switch 73 is now opened and limit switch 71 is closed. Now those relays marked T/U will be closed to deliver current. Current is first of all delivered through lines 123 and 126 via relay 115 to the valve 47a to start the belt. Current is also delivered through line 130 and a timer 119a and a relay 119 to valve 32 to operate the ejector rods. The timer 119a will limit the time during which current will flow to the valve 32 so that after a short time, the current will be turned off so that the rods 31 will be immediately withdrawn.

The article A now moves onto the conveyor, properly oriented (as described above) until it interrupts the current at photocell 72. This opens relay contact 112 and closed contacts 113. This interruption of current in lines 123, 124 and 126 interrupts the current to the valves 38 and 47a. Consequently, these valves move to their opposite positions to raise the deflector member 37 and stop the belt 45, respectively. Further, current through line 140 and relay contact 141 operates valve 56 to lower the conveyor lift 40.

When the conveyor lift reaches its lowermost position, the switch 71 is of course opened and the limit switch 73 is closed, once again closing the T/D relays. This permits current to flow through line 127 and relay contacts 116 to the valve 47a for starting the belt 45. This continues until the article passes the beam, whereby contacts 113 again open and contacts 112 close. This of course terminates the current to valve 47a whereby the conveyor 45 stops. Also, current through switch 73 and line 131 passes through a line 142 and through an interlock device 143 to the valve 29 for operating the main clamping cylinder piston 28. Interlock 143 will not permit movement of the piston 28 until it is safe to do so, this interlock being responsive, for example, to the conveyor 43 moving to the downward position and the deflector member 37 moving to the raised position. Also, there may be a safety door covering the entire mold area which would have to be closed before interlock 143 permitted current to flow to the valve 29.

It will be apparent that numerous modifications and variations are possible within the scope of the invention. To mention only a few of these, the various piston and cylinder units have been described as either hydraulic or pneumatic, as the case may be, but of course in some cases the other type of fluid would also be operable. The various limit switches have been described as located at specific points. However, it will be apparent that those switches can be located at numerous other points and still carry out their necessary functions. It would also be desirable to make some of these limit switches adjustable so as to vary the precise position at which they are actuated. This would be especially true with respect to limit switch 71 which is actuated upon lifting movement of the folding lift 40. Other variations and modifications will be apparent to those skilled in the art.

I claim:
1. An injection molding apparatus comprising:
a vertically supported stationary platen,
a vertically supported movable platen,
power means to activate said movable platen in a horizontal direction towards and away from said fixed platen, said platen defining a space therebetween when said platens are in an open position,
mating mold halves, one mold half mounted on each of said platens,
said mold halves defining a space therebetween when said platens are in an open position,
a base portion of said apparatus defining an open space therein, at least a portion of said space being directly below said space defined by said open platens,
means for receiving a finished article from said apparatus and conveying said article away from said mold halves, said means for receiving and conveying disposed within the base portion below the mold halves and including an upwardly facing receiving surface,
an operating means disposed within said space in the base portion.
said operating means including means attached to said receiving and conveying means for lifting it solely in a vertical direction to move said receiving means upwardly into the space defined by said open platens for receiving an article formed in said apparatus, and operable to move said receiving and conveying means downwardly out of said space to permit reclosing of the mold halves for a subsequent molding cycle.

2. An apparatus according to claim 1 said receiving and conveying means comprising an endless conveyor supported on the lift means, and means for operating said endless conveyor at any selected position of the lift means.

3. An apparatus according to claim 2, said lift means including a folding linkage pivotally engaged with a support plate at its upper end, the conveyor means being mounted on said support plate.

4. An apparatus according to claim 1, including means for ejecting a finished article from a first mold half onto which it is positioned upon separation and the platens, and orienting the finished article on said receiving and conveying means.

5. An apparatus according to claim 4, said means for ejecting and orienting comprising: ejector rods movable through the first mold part to separate the finished article from the first mold part, a deflector member positionable adjacent the first mold half and an upper part of the outer side of a finished article upon separation of the mold halves and said deflection member engageable with an upper part of a finished article after separation of the part from the first mold half,
means for moving the surface of the receiving and conveying means away from the first mold half as a finished article is being removed therefrom, whereby a lowermost part of a finished article engages the moving surface of the receiving and conveying means first and moves away from the first mold part, after which an uppermost part of the finished article falls onto the receiving and conveying means surface after the lowermost part.

6. An apparatus according to claim 5, said receiving and conveying means being an endless belt conveyor.

7. An apparatus according to claim 1, including means for activating the operating means to move said receiving and conveying means into the space between the platens automatically in response to separation of the platens from each other, and removing means for removing a finished article from the first mold half onto the receiving and conveying means automatically in response to movement of the receiving and conveying means into the space between the platens.

8. An apparatus according to claim 7, wherein said removing means includes ejector means for ejecting the finished article off of the first mold half, a deflector member positionable adjacent the first mold half and an outer side of a finished article and means for moving the surface of the receiving and conveying means while said ejector means ejects a finished article off of the first mold half while a top side of a finished article is engageable with the deflector member; and said ejector means and means for moving the deflector member into position adjacent a finished article being operable automatically in response to movement of the conveyor means to said space.

9. An apparatus according to claim 1, including removing means for removing a finished article from a first one of said mold halves, said removing means including deflector means for moving part of a finished article which is lowermost while on the first mold half farther away from the first mold half then an uppermost part of a finished article, and means for moving the surface of the receiving and conveying means away from the first mold half, such that a lowermost part of a finished article is engageable with the moving surface of the conveyor means first and moves away from the first mold half after which an uppermost part of a finished article falls onto the conveyor means surface behind a lowermost part.

10. An apparatus according to claim 9, said operating means including means for lifting the conveying means, and including means for stopping the conveying means surface after a finished article is located thereon, and means for operating the conveyor means surface again to transfer a finished article from the conveying means to a further receiving means after the conveying means has been lowered.

11. The apparatus recited in claim 1 and further including:
a deflection member, said deflector member being positionable closely adjacent to a first mold half mounted on the movable platen, but maintainable in spaced relation thereto, and
ejector means to eject a finished article from said first mold half so that after ejection a top portion of an article is engageable with said deflection member insuring that a bottom portion of an article is engageable with the receiving and conveying means before the top portion.

12. The apparatus recited in claim 1 and further including:
additional means to convey the finished articles away from said apparatus,
said additional conveying means being disposed within the base portion of said apparatus and cooperating with said receiving and conveying means to receive the finished article from the receiving and conveying means.

13. An injection molding apparatus comprising:
platen means for mounting mating mold parts for movement towards and away from each other,
a conveyor means cooperating with said apparatus for receiving finished articles from the mold,
an operating means operable when the platen means have moved away from each other for moving the conveyor means into the space between the separated platens to a position for receiving a finished article formed in the mold, and operable after receiving the finished article for moving the conveyor means out of said space so as to permit reclosing of the mold for a subsequent operating cycle thereof,
removing means for removing a finished article from a first one of said mold parts,
means for moving the surface of the conveyor means away from the first mold part, such that the said lowermost part of a finished article engages the moving surface of the conveyor means first and moves away from the first mold part, after which an uppermost part of a finished article falls onto the conveyor means surface behind the said lowermost part,
means for stopping the conveyor means surface after the article is located thereon, and means for operating the conveyor means surface again to transfer a finished article from the conveyor means to a further receiving means after the conveyor means has been lowered,
a deflector member in cooperative relationship with said apparatus and movable downwardly from above to a position adjacent the first mold part to limit movement of an upper portion of a finished article away from the first mold part,
means for raising the conveyor means and for lowering the deflector member automatically in response to separation of the platen means,
an ejector means which cooperates with the deflector member for causing said movement of a finished article off of the first mold part,
means for moving the surface of the conveyor means and operating the ejector means in response to upward movement of the conveyor means,
means for terminating movement of the conveyor surface, for lowering the conveyor means below the mold platens and for moving the deflector member above the mold parts, all automatically in response to a predetermined movement of the surface of the conveyor means.

14. An apparatus according to claim 13, including means for starting a further cycle of the injection molding apparatus in response to lowering of the conveyor means.

* * * * *